(12) United States Patent
Johnston

(10) Patent No.: US 10,296,734 B2
(45) Date of Patent: May 21, 2019

(54) ONE TOUCH TWO FACTOR BIOMETRIC SYSTEM AND METHOD FOR IDENTIFICATION OF A USER UTILIZING A PORTION OF THE PERSON'S FINGERPRINT AND A VEIN MAP OF THE SUB-SURFACE OF THE FINGER

(71) Applicant: IDX TECHNOLOGIES INC., Montreal (CA)

(72) Inventor: John Fitzgerald Johnston, Carmel, CA (US)

(73) Assignee: IDX Technologies Inc., Montreal, Quebec (CA)

( * ) Notice: Subject to any disclaimer, the term of this patent is extended or adjusted under 35 U.S.C. 154(b) by 0 days.

(21) Appl. No.: 15/005,167

(22) Filed: Jan. 25, 2016

(65) Prior Publication Data
US 2016/0217277 A1    Jul. 28, 2016

Related U.S. Application Data

(60) Provisional application No. 62/108,103, filed on Jan. 27, 2015.

(51) Int. Cl.
*G06K 9/00* (2006.01)
*G06F 21/32* (2013.01)

(52) U.S. Cl.
CPC ......... *G06F 21/32* (2013.01); *G06K 9/00006* (2013.01); *G06K 9/00892* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 2008/0008365 A1* | 1/2008 | Hikita | ................. | G06K 9/0002 382/124 |
| 2011/0200237 A1* | 8/2011 | Nakamura | ........... | A61B 5/1171 382/127 |
| 2011/0304720 A1* | 12/2011 | Kumar | ................. | G06K 9/0008 348/77 |
| 2014/0086459 A1* | 3/2014 | Pan | .................... | G06K 9/00006 382/124 |
| 2015/0186092 A1* | 7/2015 | Francis | ................. | G06F 3/1423 345/520 |
| 2015/0341174 A1* | 11/2015 | Mandal | ................. | H04L 9/3231 713/155 |
| 2016/0328600 A1* | 11/2016 | Che | ........................... | G06T 7/11 |

* cited by examiner

*Primary Examiner* — Randolph I Chu
(74) *Attorney, Agent, or Firm* — Bereskin & Parr LLP

(57) ABSTRACT

An apparatus for enrollment and verification of a user comprising one touch two factor biometric sensors. An enrollment process creates the baseline abstract identity information for the user. Subsequent verification processes capture new abstract identity information to be matched to the baseline on an encrypted server. A first camera takes a first surface image of a portion of a user's finger to capture the pattern of friction ridges and valleys and intersection points. A second camera takes a second subsurface image of a vein map below the surface of the user's finger. These are then fused into a binary format that cannot be reversed to reacquire either the fingerprint or the vein map. The enrollment data and the verification data are then compared to each other in order to determine if they match for authentication of the user.

19 Claims, 3 Drawing Sheets

ONE TOUCH TWO FACTOR BIOMETRIC SYSTEM AND METHOD FOR IDENTIFICATION OF A USER UTILIZING A PORTION OF THE PERSON'S FINGERPRINT AND A VEIN MAP OF THE SUB-SURFACE OF THE FINGER

TECHNICAL FIELD

The invention relates to the technical fields of biometrics, computer security, physical security, access control, and surveillance.

BACKGROUND OF THE INVENTION

Fingerprint methods are common biometric measurements for user identification, and in recent years electronic fingerprint scanning has become commonplace. Even though contactless fingerprinting methods are used, it is more standard that the fingerprint is taken by pressing a finger against a computer scanner. Fingerprint image acquisition is considered the critical step of an automated fingerprint authentication system as it determines the fingerprint image quality, which has drastic effects on overall system performance where system performance is typically measured in terms of processing speed and accuracy. Concerning accuracy, "false positives", where the system determines that there is a match when there is not a match, are the most damaging errors and are to be avoided as much as possible. In the past, the "wet ink technique" was used to obtain fingerprints. With that method, wet ink is applied to the fingertip which is then pressed against or rolled on a white card to obtain the best possible fingerprint image.

The market for biometric identification systems is driven largely by an increasing desire to free people from having to remember passwords. A system that positively identifies a person by any means that does not require memory of a password, physical possession of a key or magnetic card, or other fallible methods is needed for access to secure computing systems, access to secure physical spaces, banking, and other applications where accurate identification of a user is essential.

Presently on the market are various types of computer scanners used as fingerprint readers, but the method behind each type of scanner is to capture and store the fingerprint pattern with sufficient detail of the friction ridges and minutia since they are necessary for later comparison with other known prints. The process for capturing a fingerprint using a sensor consists of rolling or pressing a finger against the sensing area. The sensor itself can operate based on a variety of different principles, such as measurements of electrical resistance of a tested finger and imaging based on thermal or charge coupling devices. In any case, the whole print is needed and if the print taken is inadequate, the user must rescan until the system is able to determine the identity of that person.

The creation of finger decoys by groups of criminals and terrorists have recently prompted the development of blood vessel mapping technology which is expected to partially replace conventional fingerprinting technology. Finger vein scanners have been developed that map the blood vessels below the surface of a person's finger. Veins and other subcutaneous features present robust, stable and largely hidden patterns. An advantage of vein mapping systems is that the human vascular system is a unique and private feature of an individual. For example, identical twins have different and distinct infrared absorption patterns. Moreover, the vein patterns are not directly observed and therefore not easily replicated. The vein pattern will cease to exist only if a person's finger is cut off. Nonetheless, questions still remain as to whether a person's vascular pattern may be subject to change due to medical conditions, level of personal smoking, or based on a simple factor such as hand temperature. Consequently, the use of vein mapping in isolation is problematic.

Security of personal information is currently gaining greater importance. In fact, biometrics authentication technology is attracting attention as a way to ensure security of individuals. Biometrics authentication is authentication technology that uses biological information of a person, and is excellent in terms of convenience and preservation of confidentiality. Examples of known conventional biometrics authentication technology include authentication using a fingerprint, iris, voice, face, or vein on the back of a hand or on the palm side of a finger. In particular, vein biometric authentication is highly fraud-proof in terms of use of in vivo information.

A number of companies are currently manufacturing and marketing fingerprint-based personal identification devices. These products identify a person by reading his or her fingerprint by having the fingerprint come into contact with a fingerprint sensor, recognizing end points and branching points of the fingerprint, and collating them with characteristic points of registered fingerprints. These techniques typically use an image of the fingerprint that may be abstracted into some representation of the fingerprint that is then matched against known fingerprints. Therefore intercepting the fingerprint is an effective way to defeat these systems. Consequently, a second factor can be added to increase reliability.

The easiest two-factor system adds a personal identification number (PIN) or password to the fingerprint scan. This is not a one-touch two-factor technique but it can be effective in ensuring that the person belonging to the fingerprint also knows the PIN. It has two key drawbacks. First, it does not remove the need to remember a password, and second, if the password can be obtained and the fingerprint intercepted, the system can still be defeated.

One current one touch two-factor method and system for characterizing a person uses light imaging devices to take a surface image of at least one fingerprint of a user's finger and the vein map below the surface of the user's finger. Once these images have been taken, they are normally stored in a database for later comparison and verification of the user. Notably, the stored images of a fingerprint can pose serious problems for a user. For instance, the stored fingerprint images of a finger can be replicated or reverse engineered by criminals or terrorists for illegal purposes. A breach of a fingerprint database is far worse than a breach of a password file. Passwords can be changed but fingerprints cannot. Therefore, there is a requirement to avoid any possibility of intercepting fingerprints that could be used maliciously.

A further problem posed by current methods and systems for capturing the image of a user's fingerprint is related to the amount of data that has to be captured. Current methods and systems generally have to capture almost the entire surface area of a user's finger for the information to be useful for later comparison and verification of a person. This leads to errors such as false negatives when verifying a person's fingerprint since so much data has to be compared. This is more of an inconvenience than a security problem because the remedy is to rescan the fingerprint, but as stated earlier, when the fingerprint itself is stored for later comparison, this is where the security problem lies.

United States Patent Application Publication No. 2007/0177767 describes a user-friendly compact system that is used for capturing a vein pattern in a finger. The method involves contact of the finger with the surface. The method operates in reflection mode, where the emitter and detector are on the same side. U.S. Pat. No. 5,751,835 describes capturing capillaries in a fingernail using fibers. The method involves contact of the object with a surface and works in reflection mode. United States Patent Application Publication No. 2007/0058841A1 describes a system embedded in a doorknob that captures vein images in finger. The system works in the transmission mode but the camera is on the opposite side from the palm side of the hand. The method involves contact with the surface.

United States Patent Application Publication No. 2005/0047632A1 acquires a vein pattern in the finger using a transmission mode of operation. U.S. Pat. No. 7,266,223 B2 describes vein pattern acquisition in transmission mode with positioning of the finger being partially by contact and partially without contact. United States Patent Application Publication No. 2011/0007951 describes a system and method for identification of fingerprints and mapping of blood vessels in a finger. The system and method both require a light-imaging device that takes images of the surface and subsurface of a user's finger that has to be rotatable about at least one axis.

Accordingly, there exists a need for physiologically identifying a person by means of a one touch two factor biometric method and system for increasing and ensuring security of individuals that utilizes a portion of a user's fingerprint and the vein map below the surface of the user's finger.

BRIEF SUMMARY OF THE INVENTION

The one touch two factor biometric system utilizes a device that incorporates two sensors that function simultaneously. The surface sensor captures a partial image of the fingerprint that is immediately decomposed into abstract surface data comprising of geometric shapes that uniquely identify that fingerprint. The actual fingerprint image is discarded. The subsurface sensor captures the vascular mapping of the live finger. The two are fused to form the unique signature of that person. An initial enrollment signature is used as a reference for future verification signatures that are compared.

DETAILED DESCRIPTION OF THE INVENTION

The following detailed description is a currently contemplated mode of carrying out exemplary embodiments of the invention. The description is not to be taken in a limiting sense, but is made merely for the purpose of illustrating the general principles of the invention, since the scope of the invention is best defined by the appended claims.

Consequently, for a better understanding of the present invention, its functional advantages and the specific objects attained by its uses, reference should be made to the accompanying drawings, claims and descriptive matter in which there are illustrated preferred embodiments of the invention.

Figure 2:
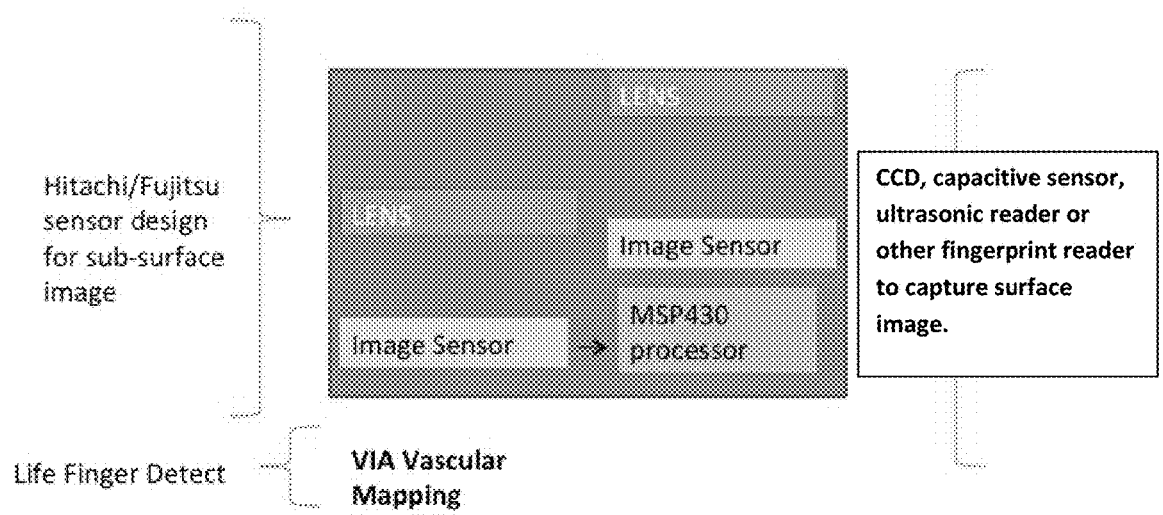
FIG. 2. An embodiment of the sensor configuration that includes a surface image sensor and a subsurface image sensor.

The one touch two factor biometric authentication system includes two sensors that function simultaneously 201, 202 (see FIG. 2). The finger (any finger may be used) is placed on the device 203. It is not rolled or moved. The device captures a partial surface image and a subsurface image from the same touch of the finger. Because the system uses a partial surface image, the system is more robust than conventional full fingerprint techniques and will not require multiple scans to complete the verification process. The scanned partial image is used only to produce the abstract surface data and is then discarded. It is never transmitted or stored in any way, eliminating the possibility of loss or theft.

Figure 1:
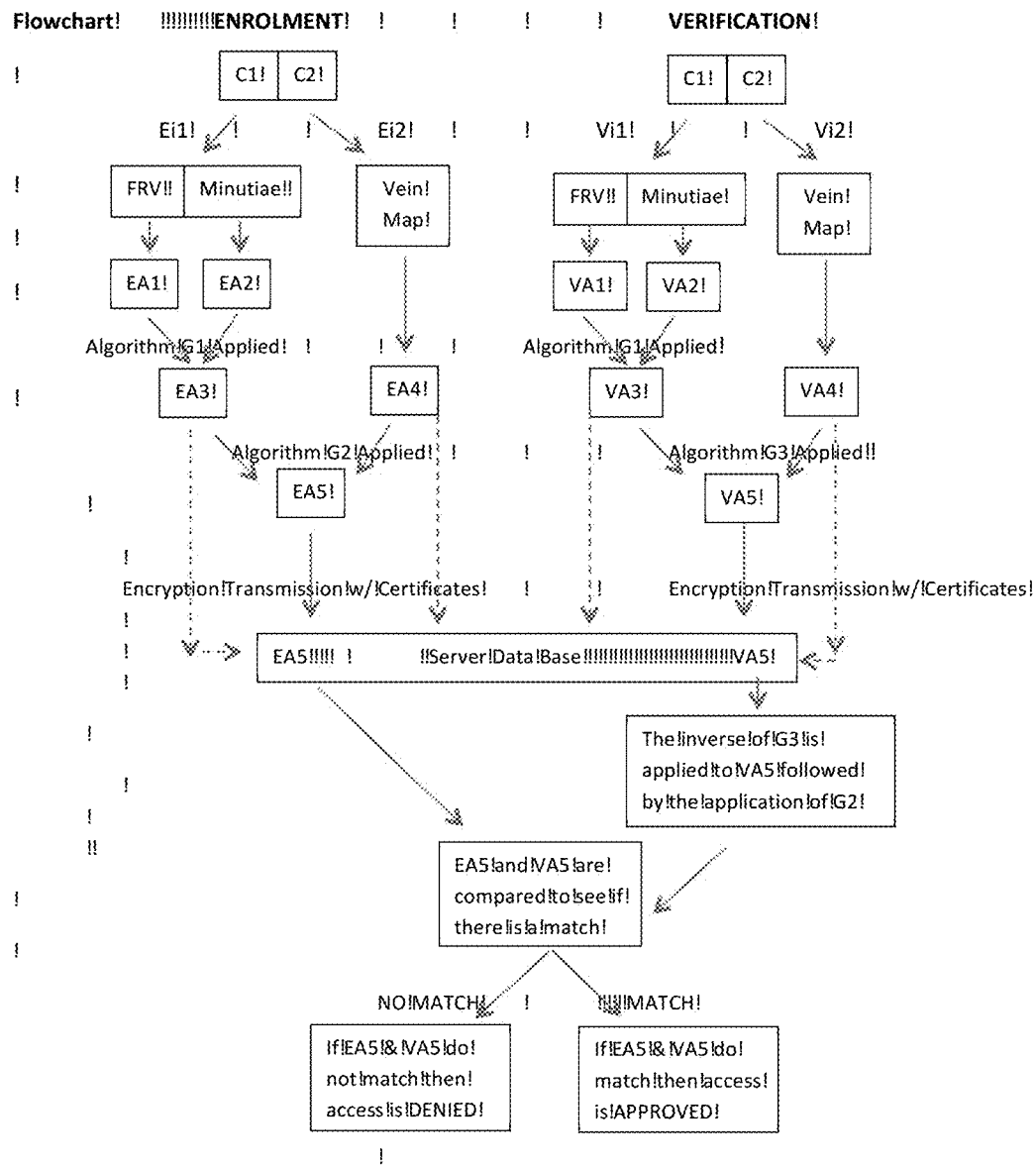
FIG. 1. The schematic process flow diagram of the invention showing both the enrollment and verification processes and how they are used to approve or deny access. The intermediate data products in this figure are referred to sequentially in the claims. EA1 is referred to as intermediate product one. EA5 is intermediate product five. VA1 is intermediate product six. VA5 is intermediate product ten.
Figure 3:
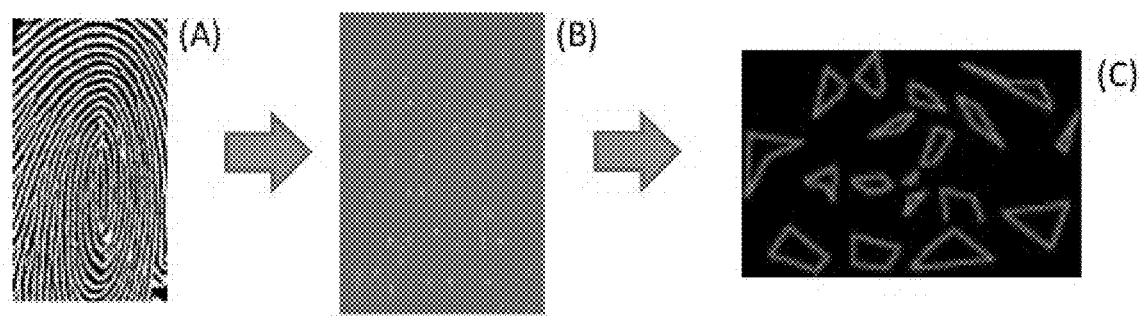
FIG. 3. The processing of the friction ridges and valleys (FRV) data that are extracted from the raw partial image (A), into a unique pattern of vectors (B) which are then processed to form geometric shapes (C). This is then converted into a binary format for further processing.

The process begins with the initial enrollment of a new identity. FIG. 1 shows the flowchart where the two sensors 101 (C1 and C2) capture their respective data. C1 takes a single frame image of a portion of the finger 301 (see FIG. 3(A)). That image is used to extract the friction ridges and valleys at intersection points 302. This minutia is referred to as Ei1 102. Simultaneously, C2 captures a single frame image of the vein map below the surface. This uses a known method utilizing an infrared light reflecting off of the hemoglobin in the finger. The process ensures that the finger is live because blood flow is required by the sensor for an accurate reading. The resulting raw data is referred to as Ei2 103.

The friction ridges and valleys form one part of the abstract identity information (FRV). These are raw lines and points 302 (see FIG. 3(B)) and, if captured, cannot be used to accurately produce the original fingerprint. The FRV is processed and converted into a binary form referred to as EA1 104. The FRV data is further processed to determine the intersection points through geometric measurements 303 (see FIG. 3(C)). This is also converted into binary form referred to as EA2 105. EA1 and EA2 constitute the raw abstract identity information. These are used by process G1 to form the unique identifier EA3 106 which is also in binary form. There are several methods for accomplishing process G1. The critical step is not the G1 process but rather the abstract nature of EA1 and EA2. For example, the SHA-2 secure hash function can be used for this purpose.

The subsurface sensor C2 produces a raw image of the vein map just below the surface of the finger. This is referred to as Ei2 103. Similar to the process for Ei1, this is converted into a binary format based on a contrast map of the image (dark and light areas in the image). This forms the fourth part of the abstract identity information, EA4 107. At this point all original data from the sensors is discarded permanently. Neither EA1, EA2, EA3, nor EA4 can be used to reproduce the fingerprint or the vein map, but each is unique to this person's finger.

The enrollment process continues by fusing EA3 and EA4 through the process G2 108. Similarly to the G1 process, there are several cryptographic hash functions that can be used to accomplish this. The result is EA5 which is the final aggregate abstract identity for the finger. EA5 is encrypted and transmitted with certificates to a secure server and stored behind an appropriate firewall 109. In another embodiment, EA3 and EA4 are also transmitted to the same server so that they can be compared in a future verification process separately. If any of the abstract identities, EA3, EA4, or EA5 are intercepted, they cannot be used to reproduce a fingerprint or a vein map. They are merely a unique bit pattern.

The verification process is similar but not identical. This process is used every time a person seeks to identify himself or herself by placing their finger on the device. If the person has not been enrolled, then the enrollment process must be completed before a verification can be made. While the system is not particular about which finger is used for authentication, the same finger must be used in verification that was used for enrollment.

The same two sensors are used in verification as were used in enrollment (C1 and C2) 110. They capture raw data in the same form as enrollment but since this is a separate process, these are new data, Vi1 from the surface sensor and Vi2 from the subsurface sensor 111. Vi1 has the same two parts as Ei1 and has raw data components VA1 which are specific to the FRV and VA2 which adds intersection data. These are fused using the same process (G1) that was used in the enrollment procedure 112. This results in VA3 which is a binary representation of the fused data. Similarly, Vi2 also is converted into a binary representation VA4 113. These processes are identical to those described for the enrollment procedure.

Abstract identity information VA3 and VA4 are then fused using process G3 114. G3 is assumed to be a different process than G1 or G2 (see [28] below) but it can be the same. The resulting abstract identity information (VA5) is then encrypted and transmitted to the server with certificates 115. This is the "key" that will be used in the comparison process to determine the identity of this person.

VA5 is decrypted by the server and the one-time use certificate is immediately verified. If any failure occurs during the decryption process, the system returns a negative result and access is denied. If the certificates are legitimate, then the inverse of the G3 process is applied to the decrypted VA5 data 116. Recall that G3 is assumed not to be the same process as G2. Therefore, after the inverse of G3 is applied, G2 is applied so that the resulting VA5 is in the same format as EA5 which is now ready for comparison 117. If VA5 is a match to EA5, then there is a match and access is approved 119. If it does not match, then access is denied 118.

It should be understood that the foregoing relates to exemplary embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents, which may become known to those skilled in the art in the future.

There are several key advantages to the invention disclosed herein. That the person need not remember a password or PIN in order to be identified is a desirable attribute. Also, the fact that the person makes one action (placing the finger on the device) that triggers two separate authentication processes is an advantage. No second action is required unless the first attempt fails. The system uses only a portion of the person's fingerprint for authentication. At no time is the entire print taken, stored, or transmitted. This is critical for the security of the biometric data. The system is as efficient and accurate, if not more so, than existing methods, yet its security and convenience features are novel and superior. The system contains inherent security features that other systems do not. The inability to reverse the process from any of the intermediate data formats (EA3/VA3, EA4/ VA4, or EA5/VA5) back to the original sensor signal is critical. Even if the encryption feature were to be defeated, the resulting data would not be useful.

The transmitted abstract identity data from the enrollment process (EA5) is an encrypted binary bit pattern of a specific size. Even if the data were intercepted, it would not be useful to recreate either the fingerprint or the vein map of the person. However, it would be possible to use it in its binary form in the verification process. If a copy of a person's full abstract identity information (either EA5 or VA5) was to be intercepted, it would be possible to use it in future verifications to match to the true EA5. However, when used as intended, every time the person verifies by placing their finger on the device, the resulting VA5 will be slightly different because the user never places the finger on the sensor in exactly the same way twice. Therefore, the system checks if an exact bit pattern for VA5 has ever been used to verify a person previously. If it has, then the system can request a re-verification. If the person is legitimate, a new VA5 is produced that is slightly different, but within tolerances to verify. If the person is not legitimate, the exact same bit pattern is transmitted and the system denies access and alerts the user of a breach.

INDUSTRIAL APPLICATION

The invention described herein is useful in any industrial application where highly accurate personal identification is desired and the finger of the person to be identified is readily available. There are many examples in information technology pertaining to some form of secure data access that would benefit. The ability to use the invention with or without an added password (which would constitute a third factor) is an advantage. While data access examples do apply, the invention is not limited to the information technology domain. Physical access applications such as securing a doorway or accessing a secure deposit box at a bank will benefit from this improved security method. Ensuring that a user is an authorized user of a physical device such as an automobile, a handgun or another specific-user device will also benefit from the invention.

What is claimed is:

1. An apparatus for authentication of a user, comprising:
   a first device for obtaining a first image of a portion of a fingerprint of the user, the first image capturing a pattern of friction ridges and valleys and at least one intersection point;
   a second device for obtaining a second image of a vein map below a surface of the finger for the portion of the fingerprint;
   a communication component for providing communication with a server; and
   a processor in communication with the first device, the second device, and the communication component, the processor being configured to:
   convert the pattern of friction ridges and valleys into binary code, forming intermediate product one;
   use geometric measurements and formulated calculations to isolate and manipulate the at least one intersection point, forming intermediate product two;
   use a first calculation process to fuse intermediate product one and intermediate product two to determine a surface image identifier forming intermediate product three;

convert the vein map into binary code, based on dark and light areas of the vein map, forming intermediate product four;

use a second calculation process to fuse intermediate product three and intermediate product four, forming an abstract identifier;

transmit the abstract identifier to the server for authentication;

in response to receiving a notification from the server that the abstract identifier is authenticated, grant access to a secure asset; and in response to receiving a notification from the server that the abstract identifier is not authenticated, deny access to the secure asset.

2. The apparatus of claim 1, wherein the processor is configured to transmit the abstract identifier to the server by encrypting the abstract identifier with a one-time transmission certificate and transmitting the encrypted abstract identifier to the server.

3. The apparatus according to claim 1, wherein the first device comprises at least one of a group consisting of a camera, a capacitive sensor, an ultrasonic reader, and a fingerprint reader.

4. The apparatus according to claim 1, wherein the second device comprises a camera.

5. A method for authentication of a user, the method comprising:

storing an enrollment abstract identifier for the user in an enrollment storage unit;

obtaining a first verification image of a portion of a fingerprint of the user, the first image capturing a pattern of friction ridges and valleys and at least one intersection point;

obtaining a second verification image of a vein map below a surface of the finger for the portion of the fingerprint;

converting the pattern of friction ridges and valleys of the first verification image into binary code forming intermediate verification product one;

converting the geometric measurements and formulated calculations to isolate and manipulate the at least one intersection point of the first verification image forming intermediate verification product two;

using a first calculation process to fuse intermediate verification product one and intermediate verification product two to determine a surface image verification identifier forming intermediate verification product three;

converting the vein map of the second verification image into binary code, based on dark and light areas of the vein map, forming intermediate verification product four;

using a second calculation process to fuse intermediate verification product three and intermediate verification product four forming a verification abstract identifier;

transmitting the verification abstract identifier to a server in communication with the enrollment storage unit for authentication;

operating the server to determine if the verification abstract identifier matches the enrollment abstract identifier;

in response to the server determining that the verification abstract identifier matches the enrollment abstract identifier for the user, granting access to a secure asset; and in response to the server determining that the verification abstract identifier does not match the enrollment abstract identifier, denying access to the secure asset.

6. The method according to claim 5, wherein storing an enrollment abstract identifier for the user in an enrollment storage unit comprises:

obtaining a first enrollment image of a portion of the fingerprint, the first enrollment image capturing a pattern of friction ridges and valleys and at least one intersection point;

obtaining a second enrollment image of a vein map below the surface of the finger for the portion of the fingerprint;

deriving the enrollment abstract identifier based on the pattern of friction ridges and valleys and the at least one intersection point of the first enrollment image and the vein map of the second enrollment image; and transmitting the enrollment abstract identifier to the server.

7. The method of according to claim 6, wherein deriving the enrollment abstract identifier based on the pattern of friction ridges and valleys and the at least one intersection point of the first enrollment image and the vein map of the second enrollment image comprises:

converting the pattern of friction ridges and valleys of the first enrollment image into binary code, forming intermediate enrollment product one;

using geometric measurements and formulated calculations to isolate and manipulate the at least one intersection point of the first enrollment image, forming intermediate enrollment product two;

using the first calculation process to fuse intermediate enrollment product one and intermediate enrollment product two to determine a surface image enrollment identifier, forming intermediate enrollment product three;

converting the vein map of the second enrollment image into binary code, based on dark and light areas of the vein map, forming intermediate enrollment product four; and using a third calculation process to fuse intermediate enrollment product three and intermediate enrollment product four, forming the enrollment abstract identifier.

8. The method according to claim 6, wherein transmitting the enrollment abstract identifier to the server comprises encrypting the enrollment abstract identifier with a one-time transmission certificate and transmitting the encrypted enrollment abstract identifier.

9. The method according to claim 5, wherein storing an enrollment abstract identifier for the user in an enrollment storage unit further comprises using a firewall to protect the enrollment storage unit.

10. The method according to claim 5, wherein:

transmitting the verification abstract identifier to the server comprises encrypting the verification abstract identifier with a one-time transmission certificate and transmitting the encrypted verification abstract identifier; and operating the server to determine if the verification abstract identifier matches the enrollment abstract identifier comprises decrypting the encrypted verification abstract identifier to obtain the verification abstract identifier.

11. The method according to claim 7, wherein operating the server to determine if the verification abstract identifier matches the enrollment abstract identifier stored in the enrollment storage unit comprises:

applying an inverse of the second calculation process to the verification abstract identifier to obtain intermediate verification product three and intermediate verification product four;

applying the third calculation process to intermediate verification product three and intermediate verification product four to produce intermediate verification product five;

determining if the enrollment abstract identifier matches intermediate verification product five;

in response to determining that the enrollment abstract identifier matches intermediate verification product five, determining that the verification abstract identifier matches the enrollment abstract identifier; and in response to determining that the enrollment abstract identifier does not match intermediate verification product five, determining that the verification abstract identifier does not match the enrollment abstract identifier.

12. A system for authentication of a user, the system comprising:

a verification image reader and a server;

the verification image reader having a first verification device for obtaining a first verification image of a portion of a fingerprint of the user, the first verification image capturing a pattern of friction ridges and valleys and at least one intersection point; a second verification device for obtaining a second verification image of a vein map below a surface of the finger for the portion of the fingerprint; a verification communication component for providing communication with a server; and a verification processor in communication with the first verification device, the second verification device, and the communication component, the verification processor being configured to:

convert the pattern of friction ridges and valleys of the first verification image into binary code forming intermediate verification product one;

convert the geometric measurements and formulated calculations to isolate and manipulate the at least one intersection point of the first verification image forming intermediate verification product two;

use a first calculation process to fuse intermediate verification product one and intermediate verification product two to determine a surface image verification identifier forming intermediate verification product three;

convert the vein map of the second verification image into binary code, based on dark and light areas of the vein map, forming intermediate verification product four;

using a second calculation process to fuse intermediate verification product three and intermediate verification product four forming a verification abstract identifier; and transmit the verification abstract identifier to the server for authentication;

the server having a communication component for providing communication with the verification image reader, the server being configured to:

store an enrollment abstract identifier for the user in an enrollment storage unit;

receive the verification abstract identifier from the verification image reader;

determine if the verification abstract identifier matches the enrollment abstract identifier;

in response to determining that the verification abstract identifier matches the enrollment abstract identifier, transmitting a notification to the verification image reader that the verification abstract identifier is authenticated; and in response to determining that the verification abstract identifier does not match the enrollment abstract identifier, transmitting a notification to the verification image reader that the verification abstract identifier is not authenticated.

13. The system according to claim 12 further comprising an enrollment image reader having a first enrollment device for obtaining a first enrollment image of a portion of a fingerprint of the user, the first enrollment image capturing a pattern of friction ridges and valleys and at least one intersection point; a second enrollment device for obtaining a second enrollment image of a vein map below a surface of the finger for the portion of the fingerprint; an enrollment communication component for providing communication with a server; and an enrollment processor in communication with the first enrollment device, the second enrollment device, and the enrollment communication component, the enrollment processor being configured to:

derive the enrollment abstract identifier based on the pattern of friction ridges and valleys and the at least one intersection point of the first enrollment image and the vein map of the second enrollment image; and transmit the enrollment abstract identifier to the server; and the server being configured to store an enrollment abstract identifier for the user in an enrollment storage unit comprises the server being configured to receive the enrollment abstract identifier from the enrollment image reader.

14. The system according to claim 13, wherein the enrollment processor is configured to derive the enrollment abstract identifier based on the pattern of friction ridges and valleys and the at least one intersection point of the first enrollment image and the vein map of the second enrollment image by:

converting the pattern of friction ridges and valleys of the first enrollment image into binary code, forming intermediate enrollment product one;

using geometric measurements and formulated calculations to isolate and manipulate the at least one intersection point of the first enrollment image, forming intermediate enrollment product two;

using the first calculation process to fuse intermediate enrollment product one and intermediate enrollment product two to determine a surface image enrollment identifier forming intermediate enrollment product three;

converting the vein map of the second enrollment image into binary code, based on dark and light areas of the vein map, forming intermediate enrollment product four; and using a third calculation process to fuse intermediate enrollment product three and intermediate enrollment product four, forming the enrollment abstract identifier.

15. The system according to claim 13, wherein:

the verification processor is configured to transmit the enrollment abstract identifier to the server by encrypting the enrollment abstract identifier with a one-time transmission certificate and transmitting the encrypted enrollment abstract identifier to the server; and the server is configured to receive the enrollment abstract identifier by decrypting the encrypted enrollment abstract identifier to obtain the enrollment abstract identifier.

16. The system according to claim 12 further comprising the enrollment storage unit, the enrollment storage unit being firewall protected.

17. The system according to claim 12, wherein:
the verification processor is configured to transmit the verification abstract identifier to the server by encrypting the verification abstract identifier with a one-time transmission certificate and transmitting the encrypted verification abstract identifier to the server; and
the server is configured to receive the verification abstract identifier by decrypting the encrypted verification abstract identifier to obtain the verification abstract identifier.

18. The system according to claim 14, wherein the server is configured to determine if the verification abstract identifier matches the enrollment abstract identifier by:
applying an inverse of the second calculation process to the verification abstract identifier to obtain intermediate verification product three and intermediate verification product four;
applying the second calculation process to intermediate verification product three and intermediate verification product four to produce intermediate verification product five;
determining if the enrollment abstract identifier matches intermediate verification product five;
in response to determining that the enrollment abstract identifier matches intermediate verification product five, determining that the verification abstract identifier matches the enrollment abstract identifier; and
in response to determining that the enrollment abstract identifier does not match intermediate verification product five, determining that the verification abstract identifier does not match the enrollment abstract identifier.

19. The system according to claim 12, wherein the verification processor is further configured to:
in response to receiving a notification from the server that the verification abstract identifier is authenticated, grant access to a secure asset; and
in response to receiving a notification from the server that the verification abstract identifier is not authenticated, deny access to the secure asset.

* * * * *